ers, all of Nagaokakyo, Japan
United States Patent [19]

Kumano et al.

[11] Patent Number: 5,065,230

[45] Date of Patent: Nov. 12, 1991

[54] VIDEO SIGNAL PROCESSOR FOR SIMULTANEOUSLY REPRODUCING A PLURALITY OF VIDEO INFORMATION ON A SINGLE MONITOR PICTURE TUBE

[75] Inventors: Makoto Kumano; Masaharu Hayakawa; Shinichi Suenaga, all of Nagaokakyo, Japan

[73] Assignee: Mitsubishi Denki Kabushiki Kaisha, Tokyo, Japan

[21] Appl. No.: 410,320

[22] Filed: Sep. 21, 1989

[30] Foreign Application Priority Data

Sep. 27, 1988 [JP] Japan .................. 63-243377

[51] Int. Cl.$^5$ .................. H04N 9/74; H04N 9/45; H04N 9/445
[52] U.S. Cl. .................. 358/22; 358/19
[58] Field of Search .................. 358/30, 19, 22

[56] References Cited

U.S. PATENT DOCUMENTS 4,134,128 1/1979 Hurst .................. 358/22
4,951,126 8/1990 Ohta .................. 358/22

OTHER PUBLICATIONS

"Hitachi Mustax Digital VT-2400" Terebi Gijutsu, Mar. 1986, pp. 39-46.
"VTR 4-Picture Field Memory System" Society of Television Technical Bulletin, Dec. 10, 1986, pp. 25-30.

Primary Examiner—Howard W. Britton
Assistant Examiner—Wendy Greening

[57] ABSTRACT

A video signal processing apparatus which includes a clock signal generator for generating a clock signal in synchronism with a color synchronizing signal contained in an incoming video signal. This clock signal has a frequency equal to a multiple of the frequency of the color synchronizing signal. An analog-to-digital converter operates in response to the clock signal to sample and convert an incoming composite video signal into a digital video signal. An address setting circuit is provided for generating an address signal synchronized with horizontal and vertical synchronizing signals. The apparatus also includes a memory having addresses controlled by the address signal, a write-in device for writing bits extracted out of a digital output signal from the analog-to-digital converter into the memory in synchronism with the clock signal, a read-out device having addresses adapted to be controlled by the address signal and for reading out a digital signal from the memory in synchronism with the color synchronizing signals, and a digital-to-analog converter for converting the read digital signal read into an analog signal. The bits have phases different from that of the color synchronizing signal, the differences in phase between the bits and the color synchronizing signal being continued at a predetermined bit interval.

12 Claims, 5 Drawing Sheets

Fig. 2 (a) Continuous Wave Phase-locked to Color Burst

H. Sync Signal
Color Burst

Fig. 2 (b) V. Address 1

In Case of Clock 4fsc
H. Address w x y z w x y z w x — — — w x y z w x    905
1 2 3 4 5 6 7 8 9 10                      906
                                          907
                                          908
                                          909
                                          910

Fig. 2 (c) V. Address 2 y z w x y z w x y z — — — y z w x y z

Fig. 2 (d) V. Address 3 w x y z w x y z w x — — — w x y z w x

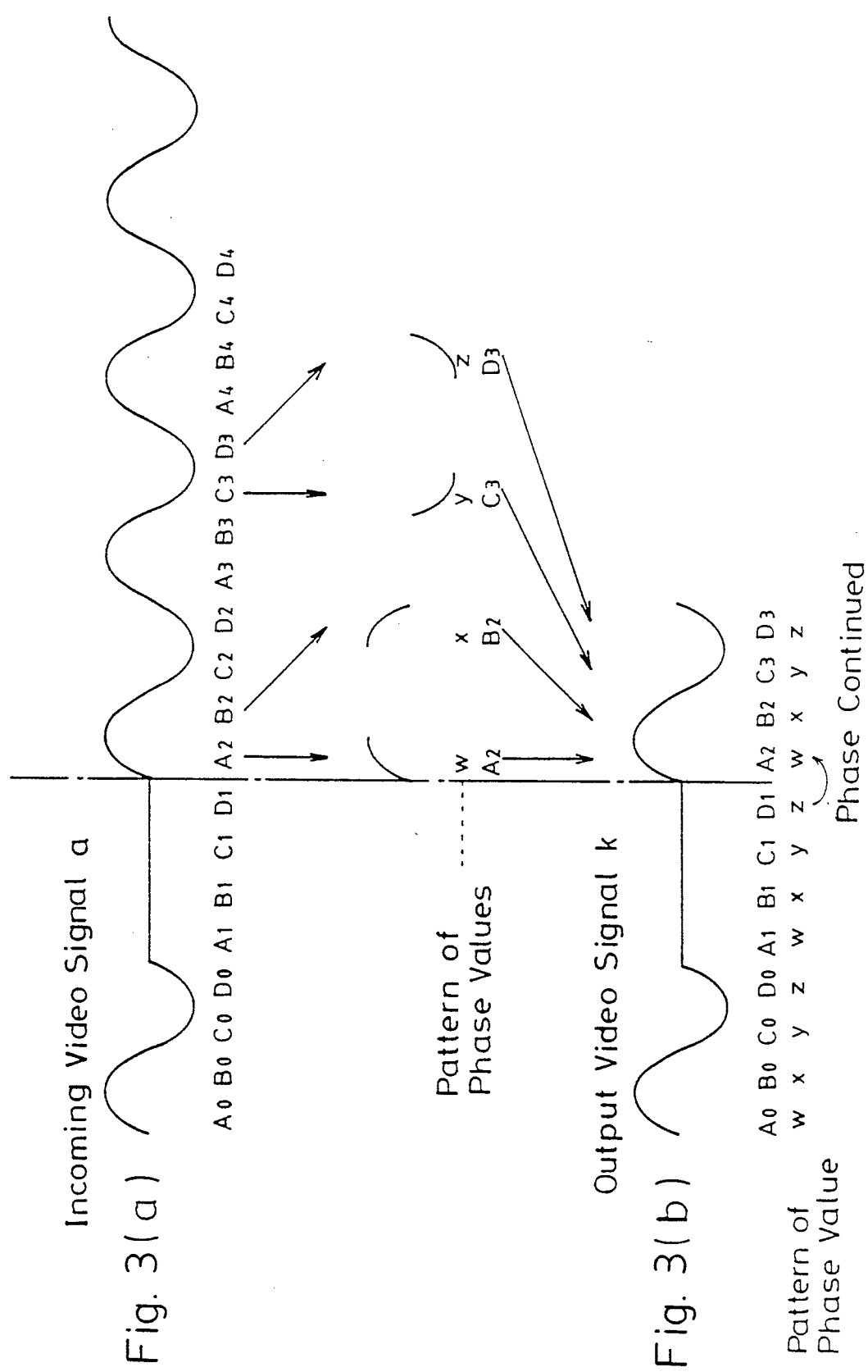

VIDEO SIGNAL PROCESSOR FOR SIMULTANEOUSLY REPRODUCING A PLURALITY OF VIDEO INFORMATION ON A SINGLE MONITOR PICTURE TUBE

BACKGROUND OF THE INVENTION 1 (Field of the Invention)

The present invention generally relates to a video signal processing apparatus and, more particularly, to a multiple picture reproducing apparatus designed to simultaneously reproduce a plurality of video information on a single monitor picture tube.

2 (Description of the Prior Art)

A multiple picture reproducing apparatus, hereinafter referred to as a multi-picture reproducing apparatus is well known as an apparatus capable of simultaneously reproducing a plurality of video information simultaneously on a single monitor picture tube such as, for example, a cathode ray tube, with different reproduced pictures occupying divided areas of the screen of the picture tube. As example of the prior art multi-picture reproducing apparatus is disclosed in, for example, a paper "Hitachi Mustax Digital VT-2400" published in magazine, "Terebi Gijutsu", the issue of March, 1986, p. 39-46, and a paper "VTR 4-Picture Field Memory System" (Japanese) published Dec. 10, 1986, in a Society of Television Technical Bulletin, p. 25-30, and generally takes such a construction as shown in FIG. 4 of the accompanying drawings.

Referring now to FIG. 4 for the detailed discussion of the prior art multi-picture reproducing apparatus, the apparatus comprises a demodulator for demodulating an incoming composite video signal a into a color difference signal and a Y signal; analog-to-digital (A/D) converters 1A, 1B and 1C for sampling and converting into respective digital signals the Y signal, B-Y signal and R-Y signal which are outputted from the demodulator 11; memories 4A, 4B and 4C for the storage of the respective digital signals outputted from the associated analog-to-digital converters 1A, 1B and 1C; digital-to-analog (D/A) converters for converting digital signals, read out from the respective memories 4A, 4B and 4C, into analog signals; and a modulator 12 for modulating the Y signal, the B-Y signal and the R-Y signal, all being analog signals, into a composite video signal k.

The apparatus also comprises a clock generator 6 for generating a system clock signal b synchronized with the frequency of a color burst signal included in the incoming composite video signal a; a clock control circuit 7 for generating an operating clock signal c; a sync signal separating circuit 8 for separating a horizontal synchronizing signal d and a vertical synchronizing signal e from the incoming composite video signal a; a sync signal control circuit 9 for outputting a horizontal reset signal f and a vertical reset signal g in response to the horizontal synchronizing signal d and the vertical synchronizing signal e, respectively; and a memory controller 10 operable to output a write-in control signal h and a read-out control signal i in synchronism with the operating clock signal c from the clock control circuit 7 to output and also operable in response to the horizontal reset signal f and the vertical reset signal g outputted from the sync signal control circuit 9 to generate an address signal j.

The prior art multi-picture reproducing apparatus operates in the following manner. The demodulator 11 demodulates the incoming composite video signal a into the Y signal, the B-y signal and the R-Y signal all of which are the color difference signals. The analog-to-digital converters 1A, 1B and 1C make use of the system clock signal b from the clock generating circuit 6 as a sample clock signal for converting the Y signal, the B-Y signal and the R-Y signal into the respective digital signals which are subsequently stored in the associated memories 4A, 4B and 4C in response to the write-in control signal and the address signal j both outputted from the memory controller 10 to the memories 4A, 4B and 4C. After reduced pictures have been written in the memories 4A, 4B and 4C by the operation of the memory controller 10 as will be described, the memories 4A, 4B and 4C operate in response to the read-out control signal i and the address signal j both from the memory controller 10 to reproduce the digital signals. The reproduced digital signals are then converted by the digital-to-analog converters 5A, 5B and 5C into the analog Y signal, the analog B-Y signals and the analog R-Y signal, respectively. These analog Y, B-Y and R-Y signals are subsequently modulated by the modulator 12 into the composite video signal which is in turn outputted to the monitor.

The operation of the memory controller 10 for writing the output signals from the analog-to-digital converters 1A, 1B and 1C into the respective memories 4A, 4B and 4C will now be described.

At the outset, a video signal corresponding to one picture is stored in each of the memories 4A, 4B, and 4C. At this time, the clock control circuit 7 outputs the operating clock signal c identical with the system clock signal b outputted from the clock generating circuit 6, whereas the sync signal control circuit 9 outputs the horizontal reset signal f and the vertical reset signal g at the same timings as the horizontal synchronizing signal d and the vertical synchronizing signal e, respectively. When the vertical reset signal g is applied to the memory controller 10 from the sync signal control circuit 9, the memory controller 10 initializes horizontal and vertical components (hereinafter, referred to as horizontal and vertical addresses, respectively) included in the address signal j. When the operating clock signal c is subsequently applied to the memory controller 10 from the clock control circuit 7, the memory controller circuit 10 increases the value of the horizontal address. However, when the horizontal reset signal f is applied thereto, it initializes the horizontal address and increases the value of the vertical address. Then, when the operating clock signal c is inputted to the memory controller 10, the latter outputs the write-in control signal h to write respective data in the memories 4A, 4B and 4C at appropriate address locations. However, when the vertical reset signal g is subsequently inputted to the memory controller 10, the latter ceases generating the write-in control signal h and, hence, the memory write-in operation.

Thereafter, the writing operation of reduced pictures is carried out. At this time, the clock control circuit 7 generates the operating clock signal c only at a video portion or a video signal existing region of the incoming composite video signal a, which portion can be obtained when the horizontal and vertical synchronizing signals d and e are inputted. Further, it also generates, as the operating clock signal c, a signal obtained from the system clock signal b by dividing the frequency of the latter according to the scale of reduction of the reduced pictures. Similarly, the sync signal control circuit 9 generates the horizontal reset signal f only at the video portion of the incoming composite video signal a, and also generates the horizontal reset siangl f at a timing corresponding to a signal obtained from the horizontal synchronizing signal d by dividing the frequency of the latter according to the scale of reduction of the reduced pictures. The vertical reset signal g is outputtted at the timing of the vertical synchronizing signal e. When the vertical reset signal g is inputted to the memory controller 10, the memory controller 10 set both of the horizontal and vertical addresses at arbitrarily chosen addresses within a video portion. On the other hand, when the operating clock c is inputted to the memory controller 10, the horizontal address is incremented. However, when the horizontal reset signal f is inputted to the memory controller 10, the horizontal address is reset and the vertical address is incremented. When the operating clock signal c is subsequently inputted to the memory controller 10, the latter outputs the write-in control signal h to write respective data in the memories 4A, 4B and 4C at specified address locations. On the other hand, when the next succeeding reset signal g is inputted to the memory controller 10, the latter sets the horizontal and vertical addressed at other arbitrarily chosen addresses within the video portion. Thereafter, similar operation is repeated.

FIG. 5 illustrates the manner in which a plurality of, for example, four, reduced pictures are written in the memories 4A, 4B and 4C for the formation of split pictures on the screen of the picture tube. After the composite video signal corresponding to one picture has been written in all of the memories 4A, 4B and 4C as shown in FIG. 5(a), an address allocation value is set on a top left corner of the screen of the monitor picture tube. The clock control circuit 7 outputs, as the operating clock signal c, the signal obtained from the system clock signal b by dividing the frequency of the latter by two within the video portion of the incoming composite video signal a, and the sync signal control circuit 9 outputs, as the horizontal reset signal f, the signal obtained from the horizontal synchronizing signal d by dividing the frequency of the latter by two within the video portion of the incoming composite video signal a. After the write-in operation of the reduced pictures as shown in FIG. 5(b), the address allocation value is aligned with a point L lying on a vertical center line of the screen of the monitor picture tube. Thereafter, by setting the address allocation values at a point M lying at a left-hand portion of the horizontal center line of and at the center N of the screen of the monitor picture tube (as shown in FIGS. 5(c), 5(d) and 5(e), respectively, the composite video signals for four divided pictures are written in the respective memories 4A, 4B and 4C. By initializing the addresses stored in the memories 4A, 4B and 4C and subsequently reading out the data written in the memories 4A, 4B and 4C therefrom, in response to the read-out control signal i, the four divided pictures are reproduced on the screen of the picture tube (as shown in FIG. 5(e).

According to the prior art system as described above, the video signal processing apparatus is so designed as to demodulate the color difference signals from the incoming composite video signal to form the divided pictures which are subsequently modulated into the composite video signal so that video information contained in the composite video signal can be reproduced on the screen of the monitor picture tube. Not only does this render the video signal processing apparatus complicated in structure and expensive in manufacturing cost, but further the use of both the demodulator and the modulator tends to bring about a problem associated with deterioration of the color information.

SUMMARY OF THE INVENTION

The present invention has been devised with a view of substantially eliminating the above discussed problems inherent in the prior art video signal processing apparatus and has, for its primary object, providing an improved video signal processing apparatus which is simple in structure and inexpensive to manufacture and, also, which is effective to minimize the deterioiration of the color information which would otherwise occur when the incoming video signals are sequentially demodulted and modulated, such as in the prior art video signal processing apparatus.

In order to accomplish the above described object, a broad aspect of the present invention is to provide an improved video signal processing apparatus which comprises a clock signal generating circuit for generating a clock signal in synchronism with a color synchronizing signal contained in an incoming video signal. This clock signal has a frequency equal to a multiple of the frequency of the color synchronizing signal. An analog-to-digital converter operates in response to the clock signal to sample and convert an incoming composite video signal into a digital video signal. An address setting means is provided for generating an address signal synchronized with horizontal and vertical synchronizing signals contained in the input video signal. The apparatus also comprises a memory means having addresses controlled by the address signal, a write-in means for writing bits extracted out of a digital output signal from the analog-to-digital converter into the memory means in synchronism with the clock signal, a read-out means having addresses adapted to be controlled by the address signal synchronized with the horizontal and vertical synchronizing signals contained in an arbitrary video signal, and a digital-to-analog converter for converting the digital signal read ouut by the read-out means into an analog signal. The bits have phases different from that of the color synchronizing signal, the differences in phase between the bits and the color synchronizing signal being continued at a predetermined bit interval. The read-out means is operable to read out a digital signal from the memory means in synchronism with the color synchronizing signal contained in the arbitrary video signal. In this construction, when the bits are read out from the memory means in synchronism with the color synchronizing signal, and are subsequently subjected to the digital-to-analog conversion, divided picture signals can be obtained.

BRIEF DESCRIPTION OF THE DRAWINGS

In any event, the present invention will become more clearly understood from the following description of preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined solely by the appended claims. In the accompanying drawings, like reference numerals are used to denote like parts throughout the several views, and:

FIG. 2 is a timing chart showing the relationship between horizontal and vertical addresses and a color synchronizing signal used in the embodiment of the present invention;

FIG. 3 is a diagrammatic representation showing a color synchronizing signal and a video signal used when an operation of writing reduced picture is performed;

DETAILED DESCRIPTION OF THE EMBODIMENTS

Figure 1:
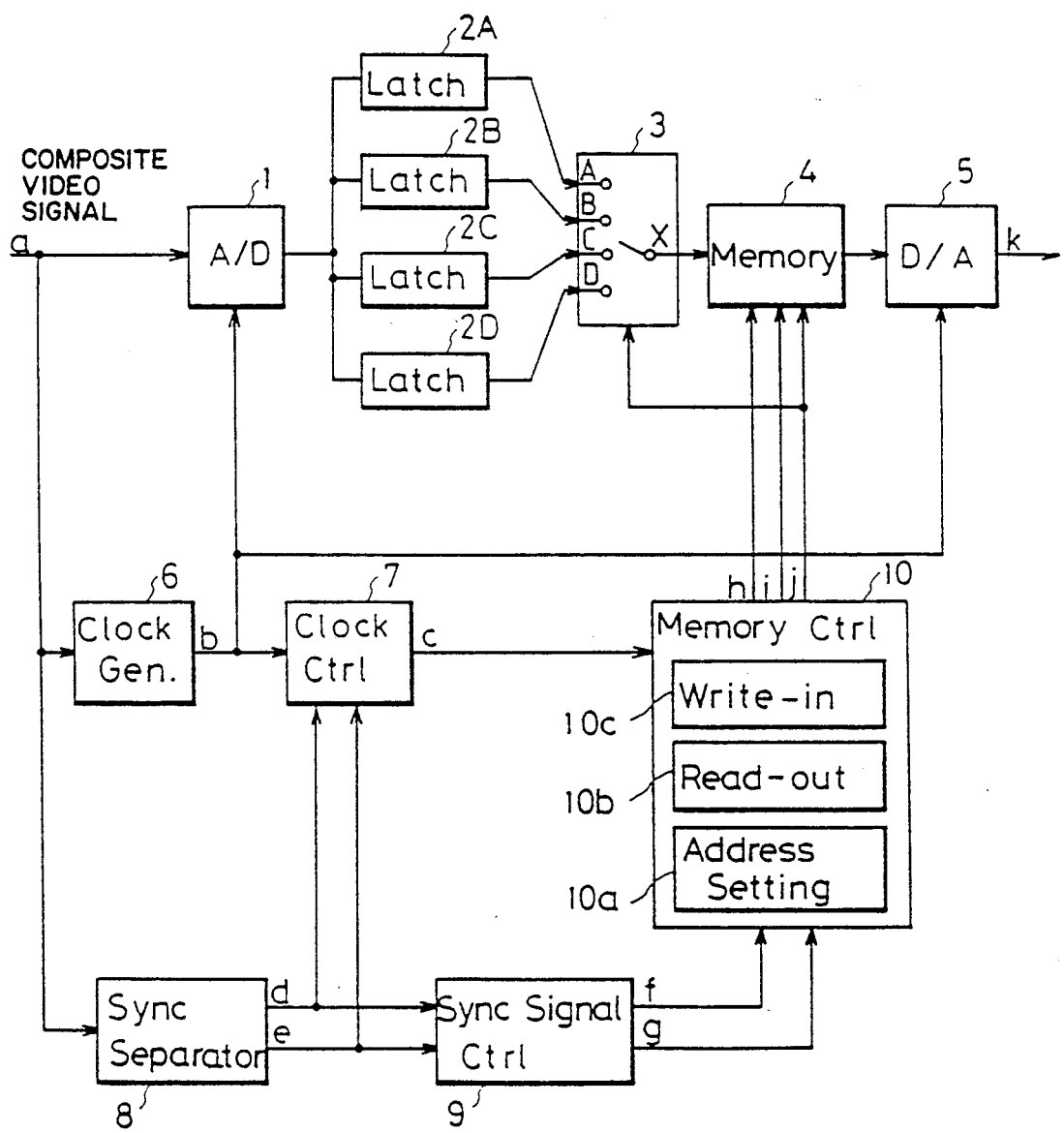
FIG. 1 is a block circuit diagram showing a video signal processing apparatus according to one embodiment of the present invention.
Figure 4:
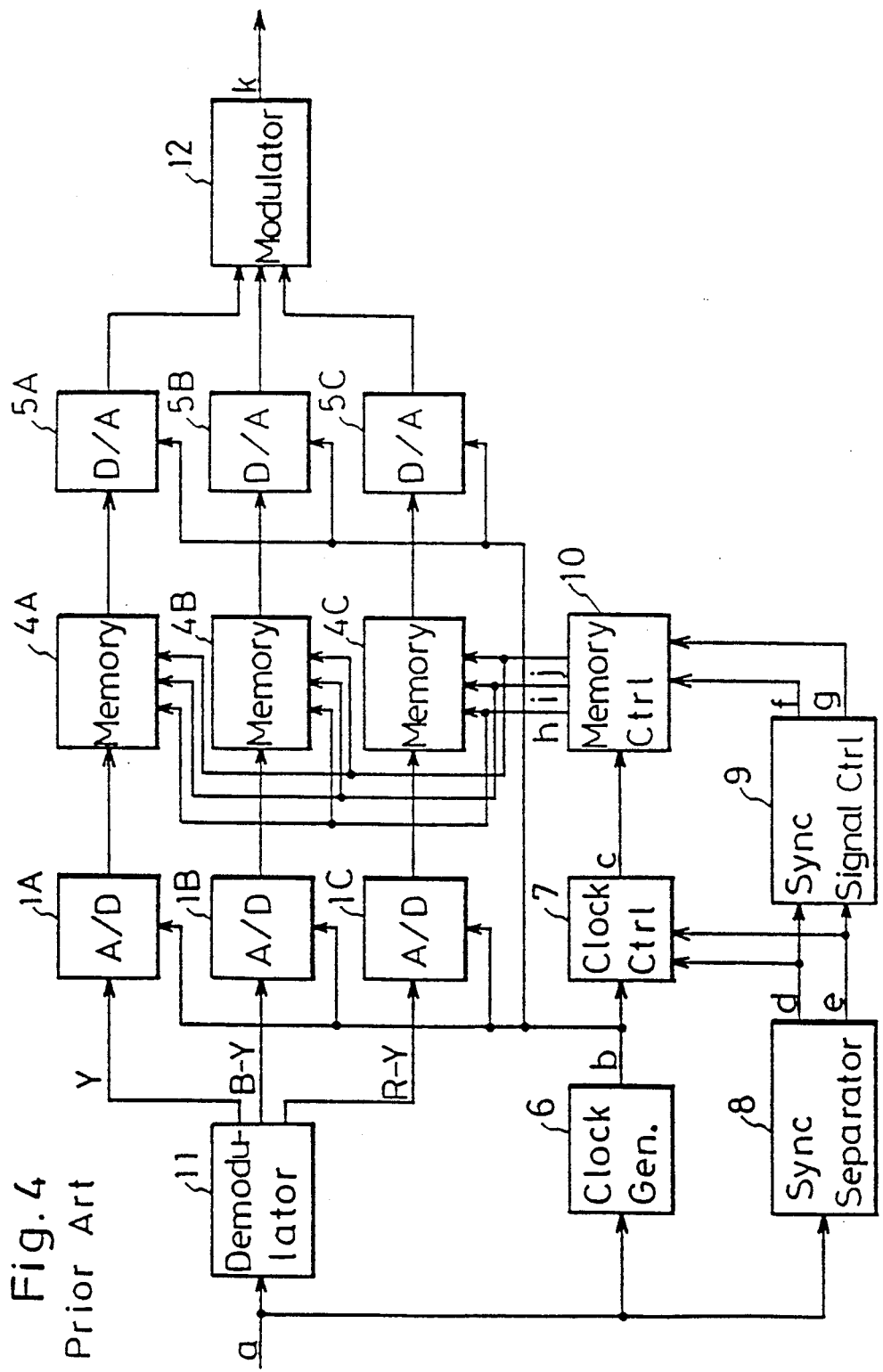
FIG. 4 is a block circuit diagram showing the prior art multi-picture reproducing apparatus.
Figure 5A:
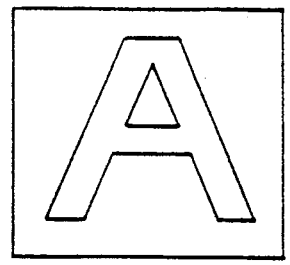
FIG. 5 is a diagrammatic representation showing the manner in which the multi-picture reproduction is carried out.
Figure 5B:
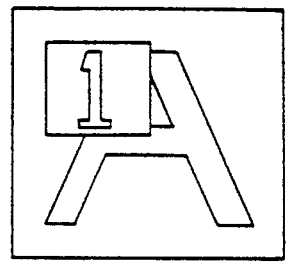
Figure 5C:
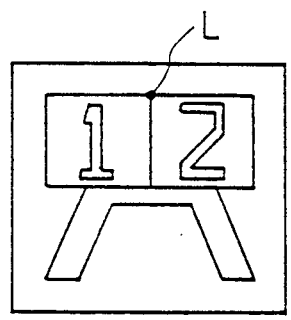
Figure 5D:
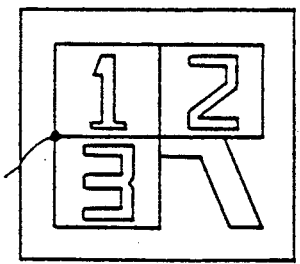
Figure 5E:
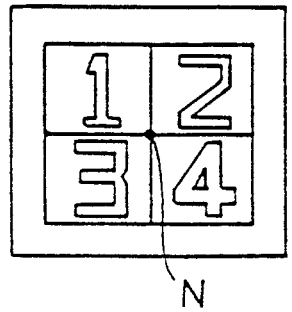

Referring to FIG. 1 showing a block circuit of a video signal processing apparatus according to a preferred embodiment of the present invention, as compared with the prior art apparatus shown in and described with reference to FIG. 4, the video signal processing apparatus of the present invention shown therein is featured in that the incoming video signal to be subjected to the analog-to-digital conversion remains in the form of the composite video signal a; in that data which have been subjected to the analog-to-digital conversion are latched by a latch circuit means 2 by the utilization of the system clock signal b according to phase differences; and in that there is provided a circuit, i.e., a switching circuit 3, for selecting data at the time of writing in a memory circuit 4. That is, it is for selecting bits having a phase different from that of the color synchronizing signal, so that the phase differences between the bits and the color synchronizing signal can be continued at a predetermined bit interval.

As shown in FIG. 1, reference numeral 1 represents an analog-to-digital converter having its output connected with latches 2A, 2B, 2C and 2D. Each of the latches 2A, 2B, 2C and 2D is connected with a digital-to-analog converter 5 through a switching circuit 3 and then through a memory circuit 4. The video signal processing apparatus shown therein also comprises a clock signal generating circuit 6, a clock signal control circuit 7, a sync separating circuit 8, a sync signal control circuit 9 and a memory controller 10. The memory cotnroller 10 comprises an address setting circuit 10a, a write-in circuit 10b and a read-out circuit 10c.

The video signal processing apparatus of the above described construction, according to a preferred embodiment of the present invention, operates in the following manner. The clock signal generating circuit 6 separates the color subcarrier wave signal (the color burst signal) from the incoming video signal a, and then generates the system clock signal b having a frequency equal to four times the frequency of the incoming video signal a. The analog-to-digital converter 1 makes use of the system clock signal b as a sampling clock signal to effect the analog-to-digital conversiton of the incoming video signal a. The digitized data emerging from the analog-to-digital converter 1 is retained in the latches 2A, 2B, 2C and 2D according to the difference in phase with the color synchronizing signal. The switching circuit 3, operable in a manner as will be detailed, selects the data which is subsequently written in the memory circuit 4 in response to the write-in control signal h supplied from the memory controller 10. On the other hand, in response to the read-out control signal i outputted from the memory controller 10 to the memory circuit 4. The data is read out from the memory circuit 4. The data is then subsequently supplied to the digital-to-analog converter 5 for the conversion into the analog composite video signal and the digital-to-analog converter 5 provides the analog composite video signal to the monitor picture tube.

The manner in which the data is written in the memory circuit 4 will now be described. The sequence in which an interleaved writing for writing the reduced picture after the video signal corresponding to one picture has been stored is substantially identical with that performed by the prior art apparatus with all of the clock control circuit 7, the sync signal control circuit 9 and the memory controller 10 functioning in a manner similar to those used in the prior art apparatus.

In the NTSC television system, the color synchronizing frequency (the frequency of the color burst signal) is standardized to be 227.5 times the frequency of the horizontal synchronizing signal. Accordingly, where the system clock signal b, having a frequency equal to, for example, four times the color synchronizing frequency, it will have a frequency which is 910 times the frequency of the horizontal synchronizing signal. In other words, as shown in FIG. 2(b) in the form of a horizontal address, 910 samples are extracted during one horizontal scanning period. Further when picture information in a vertical direction is taken into consideration, the phase values of the bits neighboring in the vertical direction, for example, between addresses 1 and 2 or between addresses 2 and 3, is displaced 180° from each other (as shown by a relationship between W and W' or between W' and W" shown in FIGS. 2(b), 2(c) and 2(d)). Therefore, the phase value of a chrominance signal at an arbitrarily chosen place on the screen can be recognized from the 2 least significant bits of the horizontal address and the least bit of the vertical address. In other words, which one of the phase values w, x, y and z shown in FIG. 4 is the phase value of the chrominance signal, can be determined.

At the time the digitized video signal corresponding to one picture is initially stored, the bits to be written in are sequentially selected by the switching circuit 3 in such a way as to connect A-X (phase value w), B-X (phase value x), C-X (phase value y) and D-X (phase value z) for writing the selected bit in the memory circuit 4 to coordinate it with the phase difference between the memory address and the color synchronizing signal. In other words, as hereinabove described, the phase difference with the color synchronizing signal can be ascertained from the three bits in total including the two least significant bits of the horizontal address and the least significant bit of the vertical address.

Where the next succeeding writing of the reduced picture is to be carried out, the data to be written in the memory circuit 4 can be obtained from the connection A-X, B-X, C-X or D-X corresponding to the phase difference with the color synchronizing signal, discriminated by the two least significant bits of the horizontal address and the least significant bit of the vertical address of the addresses to be written in.

The manner in which the writing operation is carried out will be described by way of an example in which nine reduced pictures, each being of a size (height and width) which is ⅓ of the size of the screen of the monitor picture tube and of a surface area which is 1/9 of that of the screen of the monitor picture tube. The interleaved writing procedure is illustrated in FIG. 3. In FIG. 3, a left-hand portion of the single-dotted line represents a diagrammatic representation of the color synchronizing signal portion which cannot be rewritten after the initial writing, whereas a right-hand portion of the single-dotted line represents an area in which the writing of the reduced pictures takes place. Since the initial data to be written in is of a type having a phase difference of 0' with the color synchronizing signal, of the data A2, B1, C1 and D1 retained in the respective latches 2A, 2B, 2C and 2D the data A2 is selected for writing in the memory circuit 4. Subsequently, the horizontal address is incremented by one, and, since the data to be written in is of a type having a phase difference of 90' with the color synchronizing signal, the data B2 is selected out from the data A2, B2, C2 and D2 retained in the respective latches 2A, 2B, 2C and 2D for writing in the memory circuit 4. Thereafter, the horizontal address is again incremented by one, and, since the data to be written in is of a type having a phase difference of 180' with the color synchronizing signal, the data C3 is selected out from the data A3, B3, C3 and D2 retained in the respective latches 2a, 2B, 2C and 2D for writing in the memory circuit 4. Thereafter, the horizontal address is again incremented by one, and, since the data to be written in is of a type having a phase difference of 270' with the color synchronizing signal, the data D3 is selected out from the data A4, B4, C3 and D3 retained in the respective latches 2a, 2B, 2C and 2D for writing in the memory circuit 4. In this example, the output video signal k comprising the data A2, B2, C3 and D3 has continued phase difference w, x, y and z with the color synchronizing signal. Therefore, by repeating the above described procedures, the reduced picture, substantially free from a distortion in chrominance signal, can be obtained.

Also, where four reduced pictures such as shown in FIG. 5 are to be written in the memory circuit 4, the data A2 out from the data B1, C1, D1 and A2 stored in the respective latches, the data B2 out from the data D1, A2, B2 and C2 stored in the respective latches, the data C2 out from the data B2, C2, D2 and A3 stored in the respective latches and the data D2 out from the data D2, A3, B3 and D3 have to be selected as outputs at the right-hand portion of the single-dotted line shown in FIG. 3, so that the output comprised of the data A2, B2, C2 and D2 can be obtained. In such case, during the next succeeding cycle, the output comprised of the data A4, B4, C4 and D4 can be similarly obtained.

As hereinabove described, with the video signal processing apparatus according to the present invention, since there is provided a clock signal generating circuit for generating a clock signal in synchronism with a color synchronizing signal contained in an incoming video signal, the clock signal having a frequency equal to a multiple of the frequency of the color synchronizing signal and utilized for effecting the analog-to-digital conversion of the incoming video signal in the form of the composite video signal, which composite video signal is subsequently written in and read out from the memory circuit in response to respective control signals synchronized with the clock signal, the necessity of demodulating and modulating the composite signal can be advantageously dispensed with. Therefore, as compared with the prior art apparatus, the system can be made compact in size and inexpensive in manufacturing cost with no deterioration of the color information being substantially accompanied.

Although the present invention has been fully described in connection with the preferred embodiment thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the spirit and scope of the present invention as delivered from the claims annexed hereto, to be construed as included therein.

What is claimed is:

1. A video signal processing apparatus comprising:
   a clock signal generating circuit for generating a clock signal in synchronism with a color synchronizing signal contained in an incoming composite video signal, said clock signal having a frequency equal to a multiple of the frequency of the color synchronizing signal;
   an analog-to-digital converter operable in response to the clock signal to sample and convert the incoming composite video signal into a digital video signal;
   an address setting means for generating an address signal synchronized with horizontal and vertical synchronizing signals contained in the incoming composite video signal;
   a memory means having addresses controlled by the address signal;
   a write-in means for writing the digital video signal from the analog-to-digital converter into the memory means in synchronism with the clock signal, by sequentially extracting bits over a plurality of predetermined bit intervals, having incremental phase differences from that of the color synchronizing signal, out of the digital video signal, and writing the sequentially extracted bits over each of the plurality of predetermined bit intervals into the memory means, said incremental phase differences being maintained over each predetermined bit interval;
   a read-out means having addresses adapted to be controlled by the address signal synchronized with horizontal and vertical synchronizing signals contained in an arbitrary video signal, said read-out means being operable to read out a digital signal from the memory means in synchronism with a color synchronizing signal contained in the arbitrary video signal; and
   a digital-to-analog converter for converting the digital signal read out from the memory means into an analog signal.

2. The apparatus as claimed in claim 1, further comprising:
   a plurality of latch means for classifying the digital video signal from the analog-to-digital converter into a plurality of digital video signal components according to a phase difference from that of the color synchronizing signal, and latching the plurality of digital video signal components, and
   a selecting circuit, operable in response to the address signal, for selecting a digital video signal component from the latch means such that the phase difference of the selected digital video signal component from the latch means, from that of the color synchronizing signal, can be maintained at the predetermined bit interval, and for inputting the selected digital video signal component to the memory means.

3. The apparatus as claimed in claim 1, further comprising:
   a clock control circuit, operable in response to the clock signal from the clock signal generating circuit for generating an operating clock signal, which corresponds to a signal obtained from the clock signal, by dividing the frequency of the clock signal according to a scale of reduction of a picture, wherein the timing of operation of the write-in means and that of the read-out means are controlled by the operating clock signal at a timing appropriate to the scale of reduction of the picture.

4. The apparatus as claimed in claim 3, further comprising:
   a sync signal control circuit for generating a horizontal and vertical reset signal at a period corresponding to horizontal and vertical synchronizing signals whose frequencies have been divided according to the scale of reduction of a picture, said address setting means being operable to synthesize the address signal in response to the operating clock signal and the horizontal and vertical reset signals.

5. The apparatus as claimed in claim 1, wherein the address signal comprises the two least significant bits of a horizontal address and the one least significant bit of a vertical address.

6. The apparatus as claimed in claim 5, wherein said clock signal is a signal having a frequency equal to four times the frequency of the color synchronizing signal.

7. A video signal processing method, comprising the steps of:
   (a) generating a clock signal in synchronism with a color synchronizing signal contained in an incoming composite video signal, the clock signal having a frequency equal to a multiple of the frequency of the color synchronizing signal;
   (b) sampling and converting the incoming composite video signal into a digital video signal;
   (c) generating an address signal synchronized with horizontal and vertical synchronizing signals contained in the incoming composite video signal;
   (d) writing the digital video signal into a memory, having addresses controlled by an address signal, in synchronism with the clock signal, by sequentially extracting bits from the digital video signal, over a plurality of predetermined bit intervals, having incremental phase differences from that of the color synchronizing signal, and writing the sequentially extracted bits over each of the plurality of predetermined bit intervals, into the memory, wherein the incremental phase differences are maintained over each predetermined bit interval;
   (e) reading out a digital signal from the memory, via a readout device having addresses adapted to be controlled by the address signal synchronized with the horizontal and vertical synchronizing signals contained in an arbitrary video signal, in synchronism with a color synchronizing signal contained in the arbitrary video signal; and
   (f) converting the read-out digital signal into an analog signal.

8. The method as claimed in claim 7, further comprising the steps of:
   (g) segmenting the digital video signal into a plurality of digital video signal components according to phase differences from that of the color synchronizing signal;
   (h) latching the plurality of segmented digital video signal components;
   (i) selecting a digital video signal component from the plurality of segmented digital video signal components such that the phase difference of the selected component from that of the color synchronizing signal, can be maintained at the predetermined bit interval; and
   (j) inputting the selected digital video signal component to the memory.

9. The method as claimed in claim 7, further comprising the steps of:
   (g) generating an operating clock signal, which corresponds to a signal obtained from the clock signal, by dividing the frequency of the clock signal according to a scale of reduction of a picture, wherein the timing of operation of the write-in means and that of the read-out means are controlled by the operating clock signal at a timing appropriate to the scale of reduction of the picture.

10. The method as claimed in claim 9, further comprising the step of:
    (h) generating a horizontal and vertical reset signal at a period corresponding to horizontal and vertical synchronizing signals whose frequencies have been divided according to the scale of reduction of a picture, wherein the address signal is synthesized in response to the operating clock signal and the horizontal and vertical reset signals.

11. The method as claimed in claim 7, wherein the address signal comprises the two least significant bits of a horizontal address and the one least significant bit of a vertical address.

12. The method as claimed in claim 11, wherein the clock signal is a signal having a frequency equal to four times the frequency of the color synchronizing signal.

* * * * *